United States Patent [19]

Jones et al.

[11] Patent Number: 4,764,058

[45] Date of Patent: Aug. 16, 1988

[54] DUAL SUCTION UNIT AND METHOD

[75] Inventors: Christopher R. Jones, Greensboro; L. Shannon Jones, Jamestown, both of N.C.

[73] Assignee: Templex, Inc., High Point, N.C.

[21] Appl. No.: 861,428

[22] Filed: May 9, 1986

[51] Int. Cl.⁴ .............................................. B65G 53/40
[52] U.S. Cl. .................................. 406/117; 406/153; 112/282
[58] Field of Search ............... 406/117, 153, 144, 118, 406/119, 120; 417/174; 112/282

[56] References Cited

U.S. PATENT DOCUMENTS

| 351,854 | 11/1886 | Delhaye | 406/153 |
| 472,949 | 4/1892 | Kelch | 417/169 |
| 846,973 | 3/1907 | Allington | 406/117 |
| 1,256,438 | 2/1918 | Chaney | 406/117 |
| 1,893,505 | 1/1933 | Nungesser | 406/117 |
| 2,012,077 | 8/1935 | Bingman | 406/117 |
| 3,853,079 | 12/1974 | Dunne | 417/174 |
| 4,186,772 | 2/1980 | Handleman | 406/153 |
| 4,538,941 | 9/1985 | Thorne | 406/153 |

Primary Examiner—Joseph F. Peters, Jr.
Assistant Examiner—Lynn M. Fiorito
Attorney, Agent, or Firm—Clifton Ted Hunt

[57] ABSTRACT

A dual suction unit and method of operation uses a main tube with a Venturi assembly having a primary suction inlet positioned in the inlet of the main tube and a branch tube joined at its outlet to the mid-portion of the main tube and having a secondary suction inlet at its opposite end. Compressed air flowing through the Venturi assembly induces a primary suction at its suction inlet and a significantly stronger secondary suction at the inlet of the branch tube than known in the prior art. Waste or other matter may be conveyed from separate sources to the respective primary and secondary suction inlets.

6 Claims, 1 Drawing Sheet

4,764,058

DUAL SUCTION UNIT AND METHOD

BACKGROUND OF THE INVENTION

This invention relates to an apparatus and method for providing a dual suction system by using only a single compressed air line. The illustrated embodiment of the invention is used for removing waste from two different sources.

Industrial sewing machines are provided with a chain cutter which cuts the leading and trailing ends of thread on the sewing machine. It has long been conventional practice to pneumatically convey the cut thread to a waste container for disposal.

The same sewing machine may be provided with side cutter knives which cut off uneven edges of fabric so that overlocked stitches cover the edge of one or more pieces of fabric that are sewn. The cut off portions of fabric were generally allowed to fall on the floor or in a basket prior to the invention described and claimed in U.S. Pat. No. 3,853,079 issued Dec. 10, 1974 to Owen F. Dunne.

The Dunne patent discloses a dual suction unit with a branch tube feeding into the mid-portion of a main tube. A Venturi assembly having a primary suction inlet at its outer end is positioned in the inlet of the branch tube. Dunne teaches that compressed air entering the mid-portion of the Venturi assembly induces an inward flow of atmospheric air at its primary suction inlet. The incoming atmospheric air and the compressed air flow through the branch tube into the mid-portion of the main tube and induce a secondary suction at the upstream inlet of the main tube.

Applicant has discovered that the strength of the secondary suction is significantly increased by taking the Venturi assembly out of the branch tube and repositioning it in the inlet of the main tube.

SUMMARY OF THE INVENTION

Applicant's dual suction unit also has a branch tube feeding into the mid-portion of a main tube but the Venturi assembly is provided in the inlet of the main tube instead of the branch tube, as taught by Dunne. The Venturi assembly includes a primary suction inlet arranged in line with the outlet of the main tube and a compressed air line connected to a source of compressed air. Compressed air flowing through the compressed air line induces the flow of a significantly larger volume of atmospheric air through the primary suction inlet than the volume of compressed air passing through the compressed air line. This large volume of atmospheric air moving with the compressed air straight through the main tube and past its juncture with the branch tube induces a stronger secondary suction than heretofore known in the prior art.

DETAILED DESCRIPTION OF THE INVENTION

Figure 1:
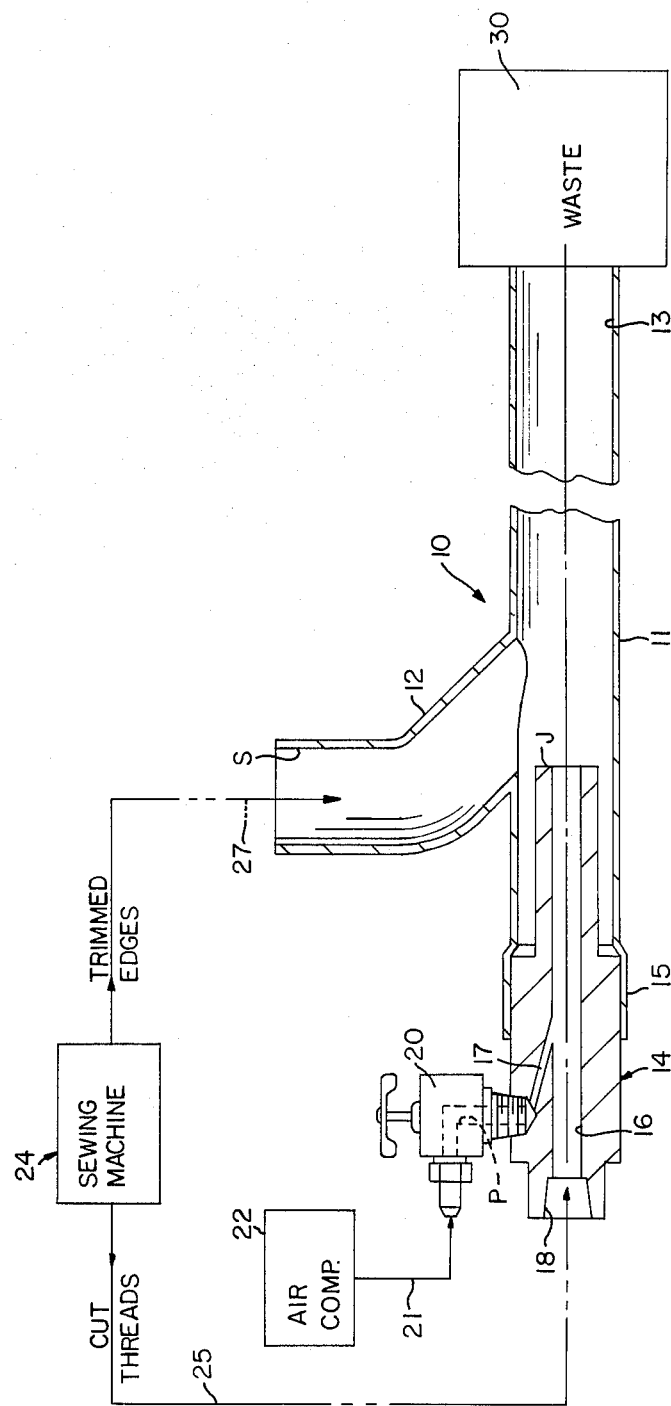
FIG. 1 is a schematic sectional view, partially in section, illustrating the Venturi assembly in the main tube of applicant's dual suction unit, and showing the primary suction inlet in the Venturi assembly and the secondary suction inlet in the branch tube arranged to receive selected waste from two different sources, such as cut threads and cut fabric edges from a sewing machine.

Those skilled in the art will find many uses for the invention. One satisfactory environment has been found in those apparel manufacturing plants of the garment industry which are equipped with compressed air lines for pneumatic removal of waste from sewing machines. The prior art Dunne dual suction system has been used in this environment with some success, but Dunne's main tube sometimes becomes clogged with fabric trimmings because there is not enough suction at the secondary suction inlet in Dunne's main tube to remove the waste trimmings.

The air pressure in garment manufacturing plants is generally 80 pounds per square inch (psi). Tests have shown that 165 standard cubic feet of air per hour (SCFH) at 80 psi produces a secondary suction of 5 inches static pressure ($H_2O$) at the secondary suction inlet of Dunne's unit.

Applicant's arrangement, as depicted in the drawing, using the same amount and pressure of air, produces a sufficiently greater suction at the secondary suction inlet in applicant's branch tube to reliably move the trimmed fabric edges and prevent clogging.

Referring more specifically to the drawing, applicant's dual suction unit is broadly indicated at 10 and includes a main tube 11 and a branch tube 12 communicating at an angle with the mid-portion of the main tube. A Venturi assembly 14 having a primary suction inlet 18 is positioned in the inlet 15 of main tube 11 and includes a passage 16 extending from the primary suction inlet 18 into the main tube 11 to a point J adjacent the juncture with the branch tube 12. The branch tube 12 defines a secondary suction inlet S at its end opposite its outlet juncture with the main tube 11. An inclined passage 17 extends between the mid-portion of the passage 16 and a passage P in an air valve 20. The open valve 20 provides communication through tubing or piping 21 with a source of compressed air schematically illustrated at 22.

Air flowing at the usual 80 psi and 165 SCFH through the inclined passage 17 of the Venturi assembly 14 causes a much larger volume of atmospheric air to flow inwardly through the primary suction inlet 18 than the volume of compressed air passing through the compressed air passage 17. The atmospheric air combines with the compressed air from the passage 17 and flows outwardly from passage 16 at the point J adjacent the juncture with the branch tube, creating a strong secondary suction at the secondary suction inlet S of the branch tube 12. The secondary suction drawn through the branch tube 12 and into the main tube 11 adjacent the point J is much stronger than known in the prior art, and enables removal of the same amount of waste with significantly less compressed air than has been heretofore possible.

Specifically, tests show a secondary suction at inlet S of the branch tube 12 of 8 inches static pressure ($H_2O$), which is significantly greater than the 5 inches of static pressure obtained at the secondary suction inlet in the main tube of Dunne's unit. Whereas the prior art requires 165 SCFH at 80 psi to produce 5 inches of vacuum pressure at the secondary suction inlet in Dunne's main tube, applicant can obtain 5 inches of static pressure at the secondary suction inlet S in applicant's branch tube 12 by using only 95 SCFH at 80 psi. The benefits from this saving of air are significant. For example, if 5 inches of static pressure is enough for a given job, applicants' apparatus can be used to operate more machines with the same amount and pressure of air than is possible with the prior ar apparatus.

The foregoing test results were obtained by measuring the negative pressure with zero (0) air flow from the atmosphere at the secondary suction inlets (inlet 28 of Dunne's main passage 26 and inlet S of applicants' branch tube 12) of dual suction units made in accordance with the teaching of U.S. Pat. No. 3,853,079 to Dunne and made in accordance with applicants' invention.

Applicant has used different test procedures yielding different numerical values and it is recognized that the numerical test values may vary with different equipment and different procedures. For present purposes, however, the test results are important only as a measure of the relative strength of the secondary suction available by positioning the Venturi assembly in the branch tube (according to the prior art) and by positioning the same Venturi assembly in the main tube (according to applicants' claimed invention).

Although different numerical values have been obtained in some tests, every test, without exception, has conclusively demonstrated that a stronger secondary suction is obtained with compressed air entering a Venturi assembly positioned in the inlet of the main tube than with the same amount and volume of air entering the same Venturi assembly positioned in the inlet of the branch tube.

Applicant's dual suction unit is illustrated as being used to carry away the waste generated by operating a sewing machine equipped with chain cutters to cut threads and cutter knives to trim the edges of fabric. The sewing machine is schematically illustrated at 24 and tubing is represented at 25 to carry the cut threads to the primary suction inlet 18 in the passage 16 through the Venturi assembly 14 for delivery into the main tube 11. Trimmed fabric edges are carried from the sewing machine through tubing represented at 27 into the secondary suction inlet S in the branch tube 12. The cut threads and trimmed edges of fabric commingle in the downstream portion of main tube 11 and are discharged through its outlet 13 into a waste container 30.

It is to be understood that the utility of the invention is not limited to use with a sewing machine, but may be used in other environments and with different volumes and pressures of air than described in the illustrated embodiment of the invention.

Although specific terms have been used in describing the invention, they have been used in a generic sense only and not for purposes of limitation.

The claimed invention is:

1. A method of removing waste from two sources of waste on a sewing machine, said method comprising the steps of:
   (a) providing a dual suction unit having
      (1) a main tube with an inlet at one end and an outlet at its opposite end and
      (2) a branch tube with an inlet at one end and and outlet juncture at its other end communicating with the main tube at a point between the inlet and outlet ends of the main tube;
   (b) providing a Venturi assembly in the inlet of the main tube;
   (c) providing a straight length of the main tube extending form the venturi assembly through the outlet juncture of the branch tube,
   (d) providing first and second delivery tubes;
   (e) connecting the first delivery tube to one source of waste on the sewing machine and to the Venturi assembly in the main tube of the dual suction unit and connecting the second delivery tube to the second source of waste on the sweing machine and the the inlet of the branch tube of the dual suction unit;
   (f) providing a source of compressed air; and
   (g) connecting the Venturi assembly to said source of compressed air, whereby suction is induced through the inlet of the main tube and through the inlet of the branch tube to deliver waste from the two sources of waste on the sewing machine to the outlet of the main tube.

2. A method according to claim 1 which includes the step of selectively closing the Venturi assembly against entrance of the compressed air.

3. In combination with a sewing machine having mechanism generating two sources of waste, a dual suction unit for removing the waste from both of said sources, said dual suction unit comprising:
   (a) a main tube having an inlet at one end and an outlet at the opposite end,
   (b) a Venturi assembly in the inlet of the main tube,
   (c) a branch tube having an inlet at one end and an outlet juncture communicating with the main tube at a point between the inlet and the outlet of the main tube,
   (d) said main tube including a straight length extending from the venturi assembly through the outlet juncture of the branch tube;
   (e) means conveying waste from one source of waste on the sewing machine to the Venturi assembly in the inlet of the main tube and from the other source of waste on the sewing machine to the inlet of the branch tube,
   (f) said means for conveying waste including
   (g) means connecting the Venturi assembly to said source of compressed air, whereby a flow of air is induced into the suction inlets of the dual suction unit and waste is removed from both of said sources of waste on the sewing machine to the outlet of the main tube.

4. The combination of claim 3 wherein the inlet and the outlet of the main tube are axially aligned.

5. The combination of claim 3 wherein the two sources of waste comprise cut threads and trimmed fabric edges.

6. The combination of claim 5 wherein the cut threads are delivered to the Venturi assembly in the main tube and the trimmed fabric edges are delivered to the inlet of the branch tube.

* * * * *